(12) United States Patent
Robertson (10) Patent No.: US 6,622,971 B1
(45) Date of Patent: Sep. 23, 2003

(54) ADAPTER FOR CONNECTING ROCKET STAGES

(75) Inventor: James Hamilton Robertson, Castle Rock, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/146,763

(22) Filed: May 16, 2002

Related U.S. Application Data
(60) Provisional application No. 60/292,636, filed on May 22, 2001.

(51) Int. Cl.⁷ ............................................. B64G 1/40
(52) U.S. Cl. ...................................................... 244/172
(58) Field of Search ............................ 244/158 R, 161, 244/172, 121, 63

(56) References Cited

U.S. PATENT DOCUMENTS

| | | | |
|---|---|---|---|
| 2,400,175 A | * 5/1946 | Suyat | 446/54 |
| 3,453,960 A | * 7/1969 | Qualls | 102/378 |
| 4,240,596 A | * 12/1980 | Winderman et al. | 244/3.16 |
| 4,776,539 A | 10/1988 | Byers et al. | 244/158 |
| 4,867,357 A | * 9/1989 | Inglis et al. | 244/121 |
| 4,884,770 A | * 12/1989 | Martin | 244/158 R |
| 5,040,748 A | 8/1991 | Torre et al. | 244/158 |
| 5,046,426 A | 9/1991 | Julien et al. | 102/377 |
| 5,242,135 A | * 9/1993 | Scott | 244/158 R |
| 5,328,132 A | * 7/1994 | Shelby, Jr. | 244/53 R |
| 5,413,514 A | * 5/1995 | Milligan | 446/36 |
| 5,529,261 A | * 6/1996 | Iddan | 244/3.16 |
| 5,603,595 A | 2/1997 | Nygren, Jr. | 411/366 |
| 5,743,492 A | * 4/1998 | Chan et al. | 244/118.2 |
| 5,969,287 A | 10/1999 | Blain et al. | 102/378 |
| 5,983,802 A | 11/1999 | Blain et al. | 102/378 |
| 5,992,328 A | 11/1999 | Blain et al. | 102/378 |
| 6,036,144 A | * 3/2000 | Sisk | 244/172 |
| 6,059,235 A | * 5/2000 | Meissinger et al. | 244/172 |
| 6,142,424 A | * 11/2000 | Wagner | 244/172 |
| 6,158,693 A | * 12/2000 | Mueller et al. | 244/158 R |
| 6,439,122 B1 | * 8/2002 | Nygren et al. | 102/377 |
| 6,450,452 B1 | * 9/2002 | Spencer et al. | 244/158 R |

FOREIGN PATENT DOCUMENTS

WO    WO 01/55663 A2    8/2001

OTHER PUBLICATIONS

Pending U.S. patent application No. 09/493,587 entitled "Separation System for Missile Payload Fairings" by Nygren, filed on Jan. 28, 2000 and assigned to Lockheed Martin Corporation (not published).

* cited by examiner

Primary Examiner—Charles T. Jordan
Assistant Examiner—Jordan M Lofdahl
(74) Attorney, Agent, or Firm—Marsh Fischmann & Breyfogle LLP (57) ABSTRACT

An adapter for connecting at least a first rocket stage of a space vehicle to a second rocket stage of the space vehicle. The adapter is configured to separate with the first rocket stage when the first rocket stage is separated from the second rocket stage. In one embodiment, at least a portion of the adapter is configured to itself separate from the first rocket stage, subsequent to separation of the first rocket stage and the second rocket stage. A second portion of the adapter remains with the first rocket stage to facilitate a controlled descent and flight of the first rocket stage back to the earth's surface.

41 Claims, 7 Drawing Sheets

ADAPTER FOR CONNECTING ROCKET STAGES

RELATED APPLICATION INFORMATION

This application claims priority from U.S. provisional application No. 60/292,636 filed May 22, 2001, entitled "Tri-Sector Upper Stage Adapter," which is incorporated herein by reference.

FIELD OF THE INVENTION

The invention is related to the field of space vehicles for use in launching a payload from a stationary ground-based position into orbit, and specifically to an adapter for connecting at least a first and second rocket stage of a space vehicle.

BACKGROUND OF THE INVENTION

Rocket powered space vehicles used in space missions can generally be categorized into launch vehicles and payloads. Launch vehicles provide the primary thrust for launching and delivering a payload from the earth's surface into orbit. Launch vehicles generally include two or more rocket stages arranged to fire at different times as the launch vehicle travels from the earth's surface into orbit. The rocket stages are fired sequentially and typically include at least a first stage or booster stage rocket and a second stage or upper stage rocket. The booster stage rocket is designed to launch and deliver the payload a pre-determined distance above the earth before exhaustion. Upon exhaustion, the booster stage rocket is jettisoned and the upper stage rocket is fired to deliver the payload the remainder of the distance into a desired orbit. Once in orbit, a payload such as a satellite, interplanetary probe, or the like is released from the upper stage. In some cases, the payload may include propulsion subsystems for orbital maintenance, attitude control, and orbital transfer depending on its intended function.

The jettisoned booster and upper stage rockets typically fall back toward the earth where they either burn up in the earth's atmosphere or reach the ground or a body of water. The separation of the rockets is accomplished using adapters that connect the various rocket stages and ultimately the final rocket stage to the payload. The adapters are designed to separate at a forward interface from the next sequential rocket stage, while a rear interface of the adapter remains attached to the separated rocket stage and returns to earth or is destroyed with the separated rocket stage in the earth's atmosphere. Several techniques are utilized to separate the adapter and exhausted rocket stage from an upper rocket stage or payload. Some common techniques include pneumatic, hydraulic, and pyrotechnic joints.

Because of the expensive nature of disposable rockets, an emphasis exists on the development of reusable launch vehicles. Reusable launch vehicles utilize rocket stages that include methods and apparatus for a controlled return to the earth's surface that prevents damage upon impact or entry and travel through the earth's atmosphere. The rocket stage may then be recovered and used in future space missions with little or no refurbishment.

SUMMARY OF THE INVENTION

The present invention generally relates to an adapter for connecting rocket stages of a space vehicle. In the context of the present invention, a rocket stage is defined as one or more rocket sections, e.g. separate rockets with individual thrust sources, or a rocket section and a payload. The present adapter provides specific advantages when used with reusable rocket stages, but those skilled in the art will appreciate that the adapter described herein could easily be used to connect any two rocket stages or a rocket stage and a payload.

In view of the foregoing, a primary object of the present invention is to provide an adapter for joining rocket stages. Another object of the present invention is to provide an adapter that upon separation of the rocket stages, the adapter itself is at least partially separatable from an exhausted rocket stage. Another object of the present invention is to protect the exhausted rocket stage during a return flight back to the earth's surface. Another object of the present invention is to enhance the aerodynamic characteristics of the exhausted rocket stage to facilitate the return flight back to the earth's surface.

One or more of the above-noted objectives, as well as additional advantages, are provided by a first aspect of the present invention, which includes an adapter for connecting a first rocket stage and a second rocket stage. The adapter forms a first interconnection between the second rocket stage and the adapter that is separatable by a first separating system. The adapter also forms a second interconnection between the first rocket stage and the adapter that is separatable by a second separating system. That is, the adapter not only separates the first and second rocket stages, but also subsequently separates from the first or exhausted rocket stage. Where the first rocket stage is a reusable rocket stage, separation of the adapter from the first rocket stage "cleans up" the first rocket stage for a controlled descent and flight back to the earth's surface.

Various refinements exist of the features noted in relation to the subject first aspect of the present invention. Further features may also be incorporated in the subject first aspect of the present invention as well. These refinements and additional features may exist individually or in any combination. For instance, the adapter of the subject first aspect may define an elongated housing made up of a plurality of detachably interconnected adapter sections (e.g., first, second, and third adapter sections). The adapter sections may be interconnected by any suitable method (both in terms of how the structural interconnection between the individual adapter sections is established and how the individual adapter sections are separated from each other). In the case where three such adapter sections are used, the interconnected adapter sections define a first, second, and third separation interface at the interconnections of the mating edges of the adapter sections. In one embodiment, the interconnected adapter sections could connect at a base thereof to the first rocket stage and include a ribbed interface about their exterior surface that mates with the second rocket stage to connect the first and second rocket stages.

Any appropriate way of detachably interconnecting the adapter with each of the first and second rocket stages may be used (both in terms of how the structural interconnection is established, and how the adapter is separated from both the first rocket stage and the second rocket stage). For instance, the separating systems could include numerous apparatus, e.g. pyrotechnics, hydraulics, and mechanical devices. In one embodiment, the first or second separating system may include an explosive fastener assembly, such as low shock producing explosive bolts, that are used to connect the base of the elongated housing to the first rocket stage. In another embodiment, where the adapter includes the plurality of adapter sections, an adapter section separating system may be utilized that includes at least one pulley mounted on one of the adapter sections, e.g. the first section, and at least one other pulley mounted on a mating adapter section, e.g. the second section. A cable alternatively wound between the pulleys and connected at one end to the first section and the other end to the second section may secure the two sections together. A similar set of pulleys and cable may then be used to secure the other adapter sections together to form the housing for the adapter, e.g. the second and third sections and the third and first sections. One or more cutting devices may also be included in the adapter section separating system to cut the cables at the desired separation time to release the first, second, and third adapter sections thereby separating the adapter sections.

The adapter of the subject first aspect may be used in combination with a shield apparatus that remains connected to the first rocket stage. In this characterization, the shield apparatus may be internally contained within the above-noted elongated housing. The adapter and shield apparatus may be characterized as a rocket stage interconnect assembly. In this characterization, the shield apparatus is longitudinally deployable relative to the first rocket stage, following the separation of the adapter from the first rocket stage (which is after the separation of the adapter from the second rocket stage). The longitudinal deployment of the shield apparatus may be used to protect surfaces, e.g. the interface between the base of the housing and the first rocket stage, that are exposed by the separation of the adapter from the first rocket stage. Preferably, the shield apparatus is aerodynamically designed to facilitate flight of the first rocket stage back to the earth's surface (e.g., in the form of a cone).

A second aspect of the present invention is a space vehicle that utilizes the above-described adapter to connect a first rocket stage and a second rocket stage. The first and second rocket stages may be a first and second rocket stage or a rocket stage and a payload. In this regard, at least one of the first and second rocket stages includes a propulsion source, such as a rocket engine.

Various refinements exist of the features noted in relation to the subject second aspect of the present invention. Further features may also be incorporated in the subject second aspect of the present invention as well. These refinements and additional features may exist individually or in any combination. For instance, the first and second rocket stages may be reusable rocket stages that include an aerodynamic control system and control surfaces for guidance back to the earth's surface following separation and/or delivery of a payload into a desired orbit. In this characterization, the above-described adapter could be used to separate the rocket stage from the payload followed by a separation of the adapter, e.g. the first, second, and third adapter sections. Preferably, in the subject second aspect, the adapter is used in combination with the above-noted aerodynamic shield apparatus for facilitating the controlled descent of the rocket stage and protection of the rocket stage during flight back to the earth's surface.

A third aspect of the present invention is a method for separating a first and second rocket stage. The method includes at least the step of separating the first rocket stage and an adapter connecting the first and second rocket stages from the second rocket stage. Additionally, the method includes the steps of separating the adapter from the first rocket stage and longitudinally deploying an aerodynamic shield or cone relative to the first rocket stage.

Various refinements exist of the features noted in relation to the subject third aspect of the present invention. Further features may also be incorporated in the subject third aspect of the present invention as well. These refinements and additional features may exist individually or in any combination. For instance, the step of separating the adapter from the first rocket stage could include the step of separating at least two of the above described adapter sections from the first rocket stage. Prior to the step of separating the at least two adapter sections, the at least two adapter sections are interconnected together and to the first rocket stage to form a housing about the aerodynamic shield or cone. Thus, the step of separating the at least two adapter sections could include the steps of separating a base of the interconnected adapter sections from the first rocket stage followed by the separation of the adapter sections themselves.

According to the present method of the third aspect, the step of separating the base could include the step of actuating the above-described low shock producing explosive bolts to release the fastener assembly connecting the base of the interconnected adapter sections to the first rocket stage. Furthermore, the step of separating the individual adapter sections could include cutting at least one or more cables securing the adapter sections together.

According to the method of the third aspect, the step of longitudinally deploying the second portion of the adapter could include retracting the aerodynamic shield or cone relative to the first rocket stage to form a seal between the aerodynamic shield or cone and the first rocket stage. The seal could be a pressure seal and/or a thermal seal that protects internal components of the rocket stage during the flight back to the earth's surface.

A fourth aspect of the present invention is embodied in a method for separating a first rocket stage from a second rocket stage, each of which has a propulsion source/system. During flight, the second rocket stage separates from an adapter that previously interconnected the second rocket stage with the first rocket stage. The propulsion source/system of the second rocket stage may then be used to continue the flight of the second rocket stage. Some time after this initial separation and before the first rocket stage returns to earth, the adapter may be separated from the first rocket stage.

Various refinements exist of the features noted in relation to the subject fourth aspect of the present invention. Further features may also be incorporated in the subject fourth aspect of the present invention as well. These refinements and additional features may exist individually or in any combination. It will also be appreciated that any and all of the features discussed above in relation to the various aspects may be used alone or in any combination.

DETAILED DESCRIPTION

Figure 1A:
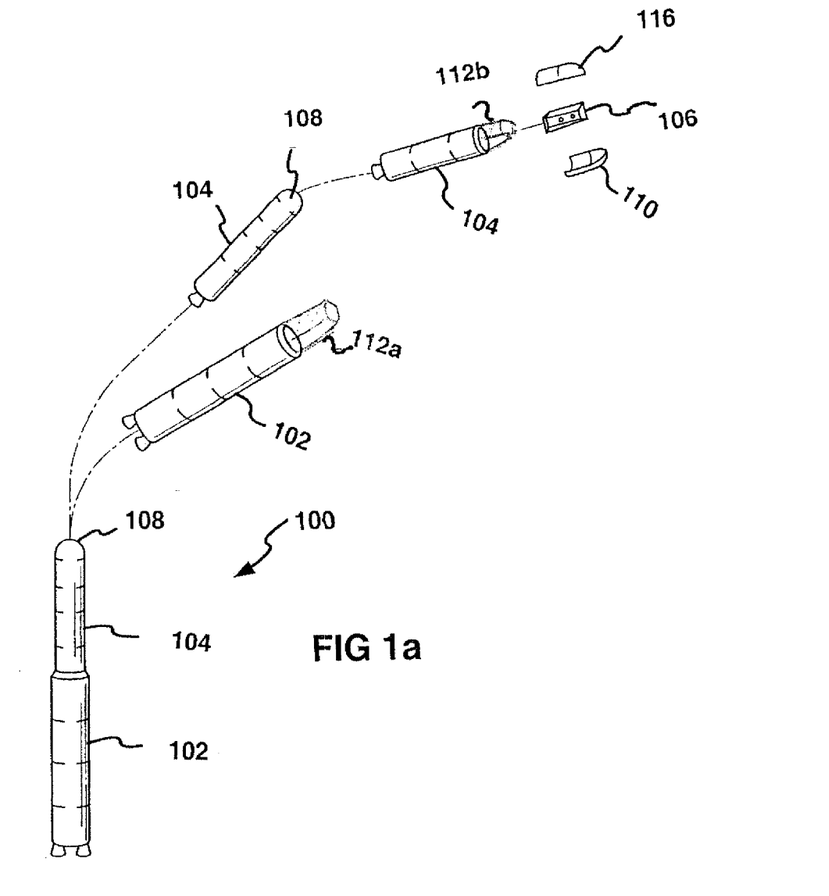
FIG. 1a illustrates one embodiment of a space vehicle having a first and second rocket stage and an inter-stage adapter that separates from both rocket stages.

Reference will now be made to the accompanying drawings, which at least assist in illustrating the various pertinent features of the present invention. FIG. 1 illustrates one embodiment of a space vehicle 100. The space vehicle 100 includes a first rocket stage 102 and a second rocket stage 104. In this embodiment, the first rocket stage 102 and the second rocket stage 104 are both preferably reusable rocket stages. The term "reusable rocket stage" herein refers to a rocket stage having apparatus and controls for aerodynamic flight back to the earth's surface, typically to a designated recovery area or landing strip.

The second rocket stage 104 includes a payload 106 housed in a payload fairing assembly 108. Typically, two or more rocket stages, as shown on FIG. 1, are required to deliver the payload 106, e.g. a satellite or satellites, interplanetary probe, weapon system or other, payload, into a desired orbit. The payload fairing assembly 108 includes fairings, 110 and 116, which protect the payload 106 during the launch and flight into a desired orbit or separation altitude. Upon reaching the desired orbit or separation altitude, the fairings, 110 and 116, are jettisoned and the payload 106 separated from the second rocket stage 104, as illustrated in FIG. 1.

Figure 1B:
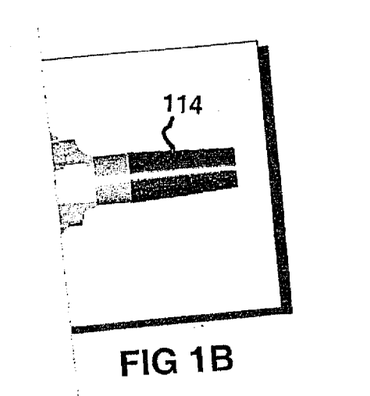
FIG. 1b illustrates a side view of the adapter of FIG. 1a, after having separated from the second rocket stage, but prior to separation from the first rocket stage.

An inter-stage adapter 112a provides a separable interconnection between the adapter 112a and the second rocket stage 104. Similarly, an adapter 112b provides a separable interconnection between the adapter 112b and the payload 106. The separable interconnection between the adapter 112a and the rocket stage 104 could be a conventional interconnection well known in the art. Similarly, the separable interconnection between the adapter 112b and the payload 106 could be a conventional interconnection well known in the art. For example, with regard to adapter 112a, the separable interconnection could include a ribbed interface 114, as shown in FIG. 1b, circumscribing the adapter 112a along a longitudinal axis of the adapter 112a. The ribbed interface 114 connects with a mating interface in a bottom portion of the second rocket stage 104. Upon exhaustion of the propulsion system for the first rocket stage 102, a pyrotechnic, hydraulic, or electromechanical separation system is activated to separate the adapter 112a and the first rocket stage 102, from the second rocket stage 104. However, as will become apparent from the following description, rather than remain with the separated rocket stage 102, the adapter 112a is designed to separate itself from the separated rocket stage 102. Similarly, upon separation of the adapter 112b and the rocket stage 104 from the payload 106, the adapter 112b is designed to separate itself from the separated rocket stage 104.

To illustrate the above-noted principles, the following description is primarily directed toward the separation of the adapter 112a and the rocket stage 102 from the rocket stage 104, as well as the subsequent separation of the adapter 112a from the rocket stage 102. It should be expressly noted, however, that while omitted for reasons of redundancy, the following description applies equally to the separation of the adapter 112b and the rocket stage 104 from the payload 106, as well as the subsequent separation of the adapter 112b from the rocket stage 104.

Figure 2:
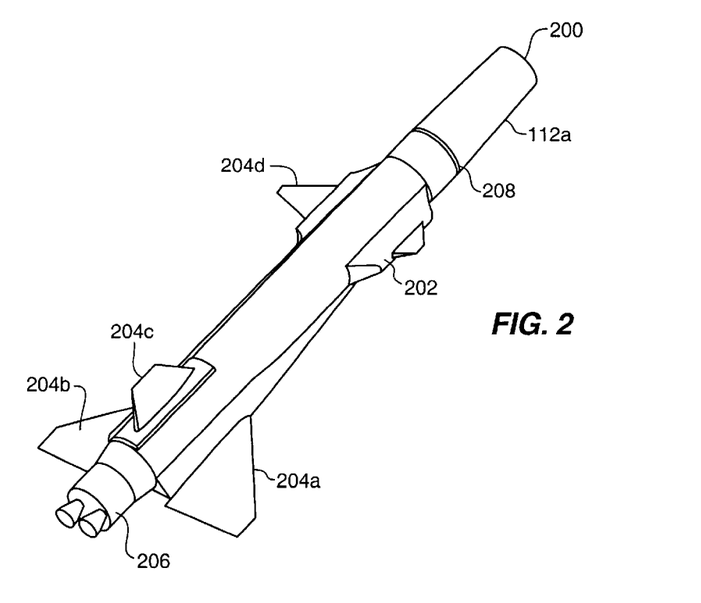
FIG. 2 illustrates a perspective view of one embodiment of a first rocket stage and an adapter following separation of the adapter from a second rocket stage, but prior to separation of the adapter from the first rocket stage.
Figure 3:
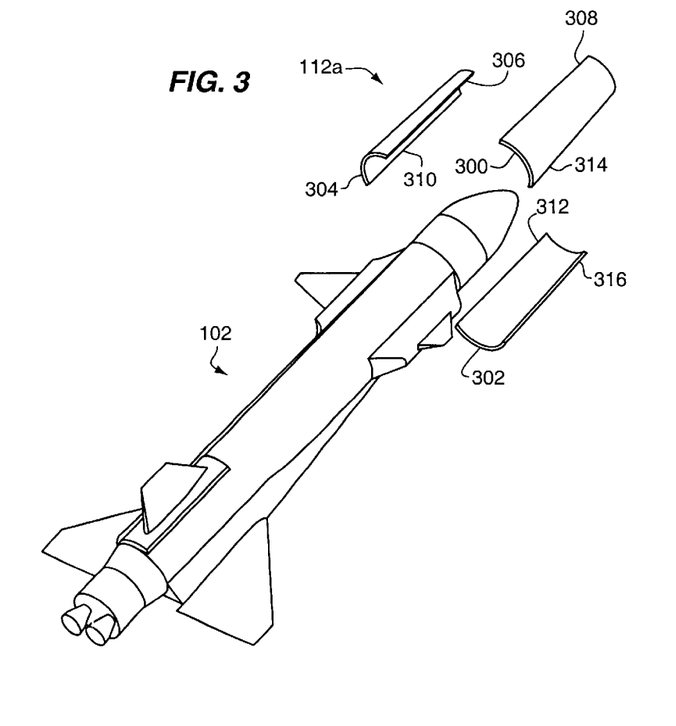
FIG. 3 illustrates the adapter of FIG. 2 being separated from the first rocket stage of FIG. 2.

Referring to FIGS. 2 and 3, the rocket stage 102 is a reusable rocket stage, and thus includes an aerodynamic control system 202, control surfaces 204a–d, and a propulsion system 206. The propulsion system 206 may include one or more rocket engines for launch and flight of the space vehicle 100 and one or more jet engines for the return flight of the rocket stage 102 back to the earth's surface. The control system 202 and surfaces 204a–d permit the controlled aerodynamic descent back to the earth's surface. Through the controlled descent, the rocket stage 102 can be recovered with The adapter 112a includes an elongated conical housing defining a central cavity 200 formed by the intersection and connection of first, second, and third adapter sections 300, 302 and 304. Alternatively, however, the adapter 112a could include more or less adapter sections as a matter of design choice. For example, it is contemplated that a functionally similar adapter could include one, two, or even four or more adapter sections as a matter of design choice. Preferably, the adapter sections 300, 302 and 304 are constructed from lightweight but durable material such as an aluminum alloy. In their connected state, the adapter sections 300, 302 and 304 define three separation planes. The first separation plane is defined by sections, 300 and 304, along mating edges 306 and 308. Sections, 300 and 302, along mating edges, 314 and 316, define the second separation plane, while the third separation plane is defined by sections, 302 and 304, along mating edges 310 and 312.

The adapter 112a also includes a separation system for separating the adapter 112a and specifically the adapter sections 300, 302 and 304 (collectively) from the rocket stage 102. Those skilled in the art will appreciate that other appropriate apparatus and method for separating structures in space may be utilized to separate the collective adapter sections 300, 302 and 304 from the rocket stage 102 as a matter of design choice. For instance, commonly assigned U.S. Pat. Nos. 5,992,328, 5,983,802, and 5,969,287 provide a detailed discussion of a separation system for separating first and second structures in space. The contents of U.S. Pat. Nos. 5,992,328, 5,983,802, and 5,969,287 are incorporated herein by reference.

In one preferred embodiment, however, the separation system includes an explosive fastener assembly that is used to mount the base 208 of the interconnected adapter sections 300, 302 and 304 to the rocket stage 102. This fastener assembly could be of a type known in the art; such as low shock producing hard point explosive bolts circumscribing the base 208 of the adapter 112a and connecting the base 208 to the rocket stage 102. The rocket stage 102 in turn includes a radial "V slot interface" to receive the base 208 of the adapter 112a for connection with the hard point explosive bolts.

Figure 4:
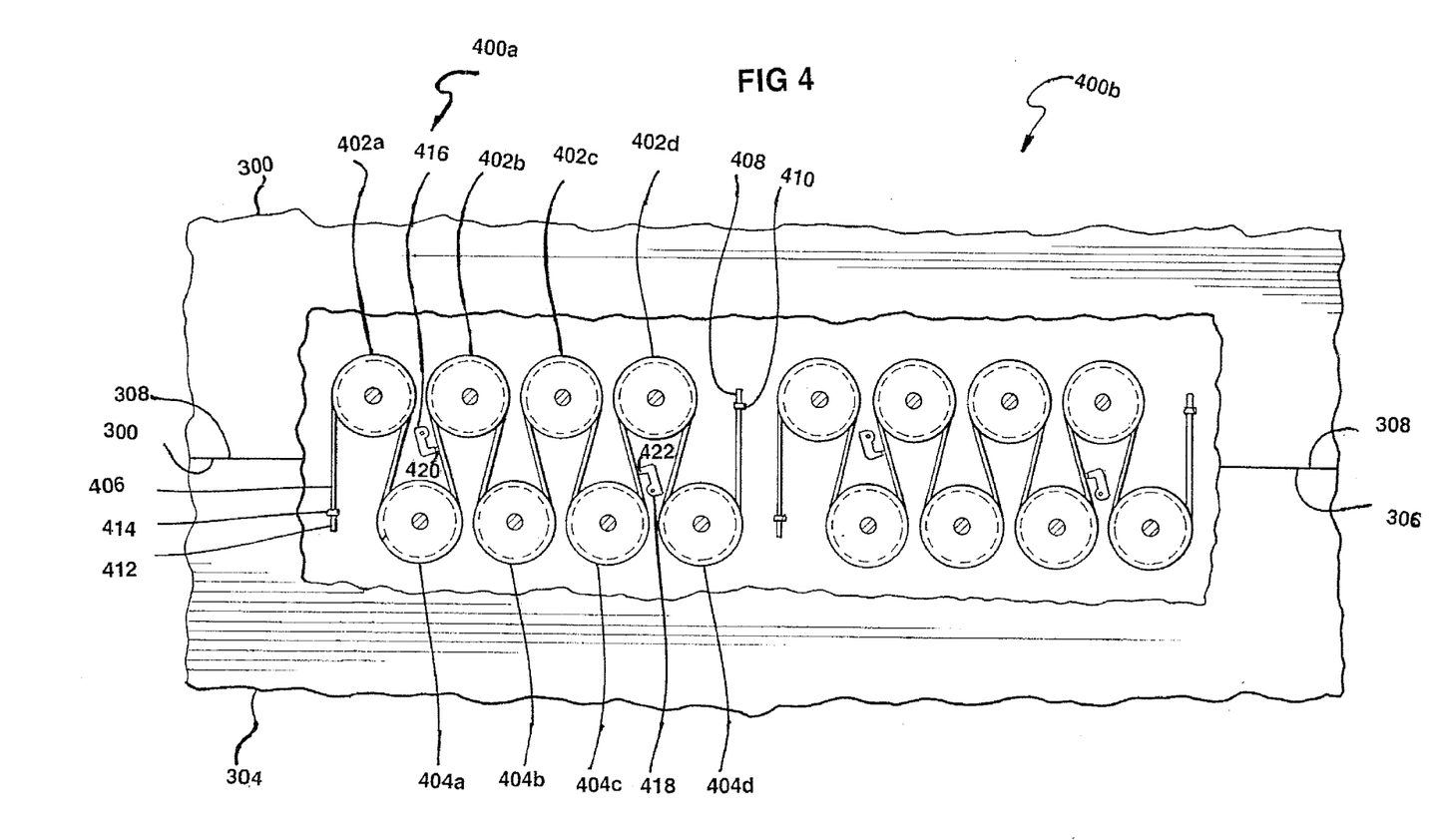
FIG. 4 illustrates one embodiment of a separation system for the plurality of adapter sections illustrated in FIG. 3, prior to activating the same for separating the plurality of adapter sections of FIG. 3 from each other.
Figure 5:
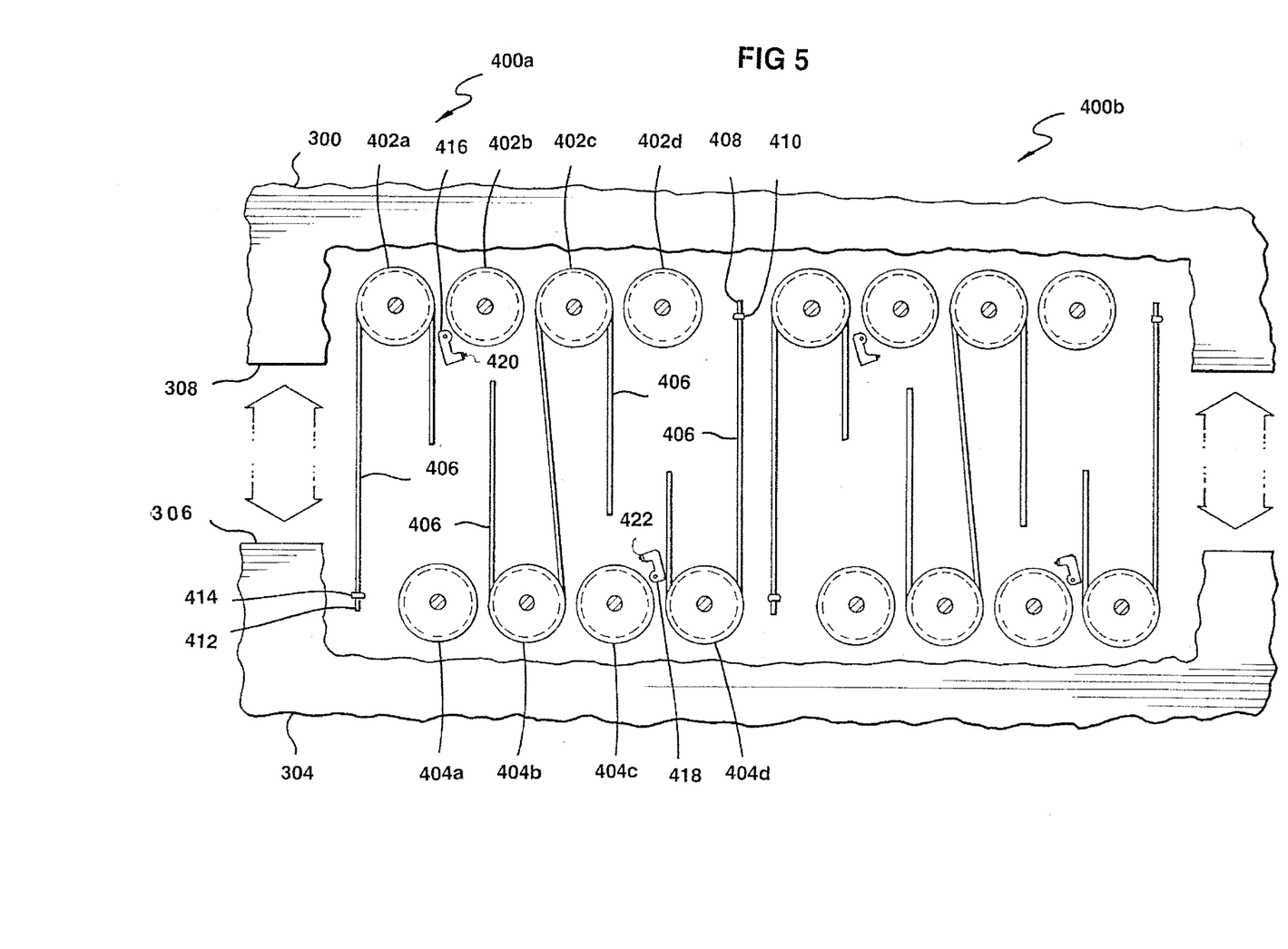
FIG. 5 illustrates the separation system of FIG. 4, subsequent to activation of the separation system to place the adapter into the configuration of FIG. 3.

Referring to FIGS. 4 and 5, the adapter 112a also includes a separation or release system to separate the adapter sections 300, 302 and 304 along the separation planes. This would typically be activated after the adapter 112a has separated from the rocket stage 102, although this could occur on other timed bases as well. As with the separation system for the base 208, the separation system for the adapter sections 300, 302 and 304 may be any suitable separation system for separating structures in space, e.g., the separation system disclosed in U.S. Pat. Nos. 6992,328, 5,983,802, and 5,969,287.

In one example, however, the separation system is mounted on the interior surfaces at the interconnections of the adapter sections 300, 302 and 304. In this regard, the separation system is exemplified by release mechanisms 400A and 400B mounted on the interior surface of edges, 306 and 308, of adapter sections 300 and 304. The mechanisms, 400A and 4008, include a plurality of pulleys 402A through 402D mounted on the adapter section 300 and a similar number of pulleys, 404A through 404D, mounted on the adapter section 304.

A cable 406 is attached at one end 408 to the adapter section 300 by an attachment fitting 410 and at its other end 412 to adapter section 304 by an attachment fitting 414. The cable 406 is preferably a high strength low melting point cable alternately wound around pulleys 402A–D and 404A–D. Some examples of the cable 406 include without limitation, a lyotropic (solvent spun) aromatic polyaramide fiber or a liquid crystal thermotropic (melt spun) polyester polyarylate fiber.

The release mechanisms, 400A and 400B, each include redundant cable cutters as exemplified by cutters, 416 and 418, on mechanism 400A. The cutter 416 is pivotally connected to the adapter section 300 and includes a heating element 420 at its distal end. The cutter 418 is mounted to the adapter section 304 and includes a similar heating element 422 at its distal end.

The cutters, 416 and 418, are mechanically and electrically operated during separation of the adapter sections 300 and 304. During operation, electrical current is applied to the heating elements, 420 and 422, as the cutters, 416 and 418, are mechanically pivoted in the direction of the cable 406 to contact and melt through the cable 406. During assembly, the adapter sections, 300 and 304, are preloaded so that when the cable 406 is cut, the adapter sections, 300 and 304, separate away from each other and the rocket stage 102. Alternatively, however, those skilled in the art will appreciate that other release mechanisms, e.g., explosive linear shear joints between the adapter sections 300, 302 and 304, could be utilized as a matter of design choice.

Figure 6:
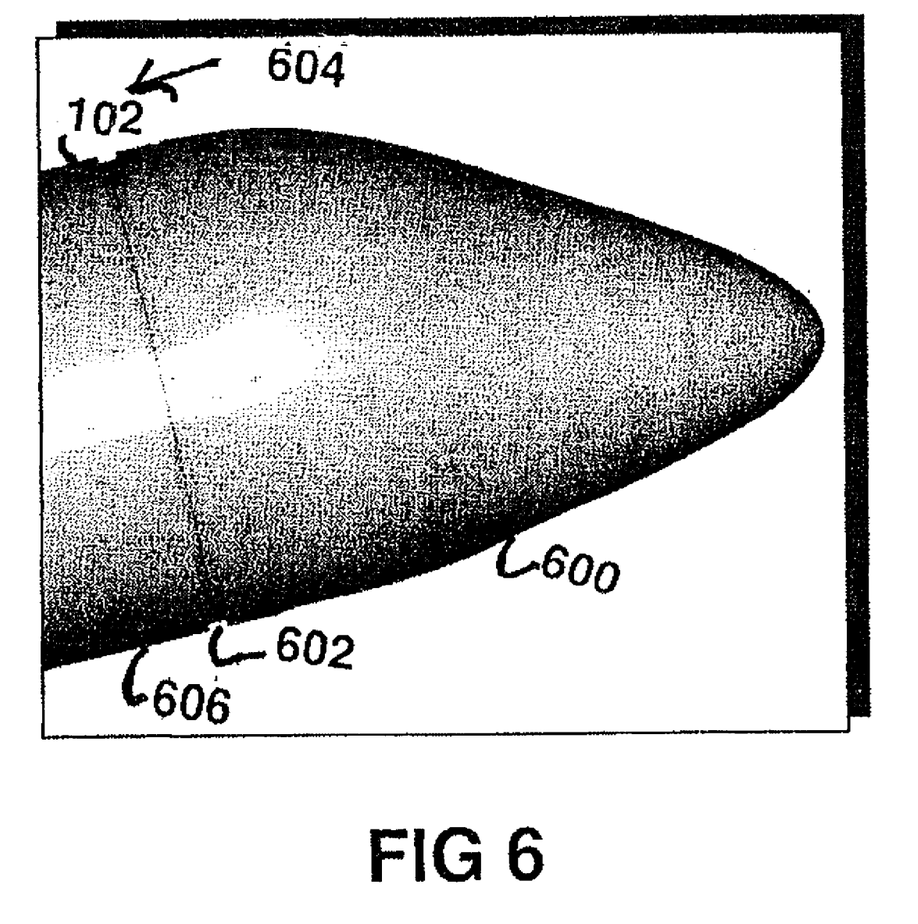
FIG. 6 illustrates one embodiment of a cone or shield apparatus in an un-deployed state.
Figure 7:
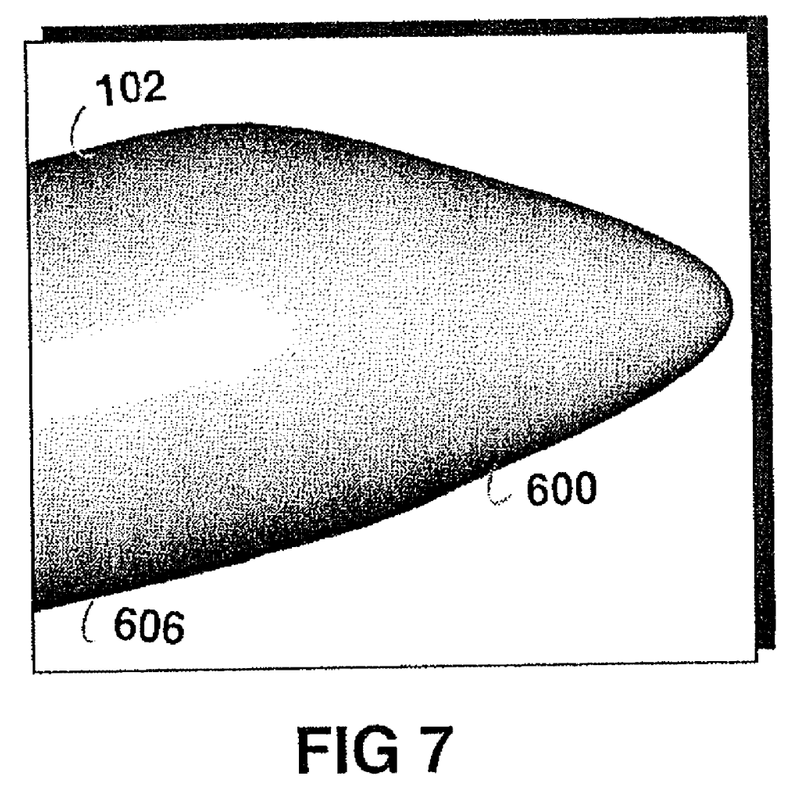
FIG. 7 illustrates one embodiment of the cone or shield apparatus of FIG. 6 in a deployed state; an FIG. 8 is a flow chart illustrating one embodiment of a protocol for releasing an adapter from a pair of rocket stages.

Referring to FIGS. 6 and 7, the adapter 112a may house an aerodynamic shield, or nose cone 600, that is longitudinally deployable in the direction 604 relative to the rocket stage 102. Since the cone 600 enhances the disconnection of the adapter 112a from the rocket stage 102, the adapter 112a and cone 600 may be characterized as an interconnect assembly or the like. Generally, the nose cone 600 is designed to remain with the rocket stage 102 after the adapter sections 300, 302 and 304 are collectively jettisoned and then separated from each other to facilitate an aerodynamic descent and flight back to the earth's surface of the rocket stage 102. In that regard, when the adapter sections 300, 302 and 304 are jettisoned, an annular channel 602 is exposed where the adapter sections 300, 302 and 304 were previously connected at their base 208 to the rocket stage 102. The nose cone 600 is longitudinally movable along axis 604 between an un-deployed position of FIG. 6 and a deployed or retracted position, illustrated in FIG. 7, to "clean up" the rocket stage 102 for reentry into the earth's atmosphere and to protect internal components from adverse aerodynamic and atmospheric conditions. In the retracted position, the nose cone 600 forms one or more seals with the main housing 606 of the rocket stage 102. Preferably, the retracted nose cone 600 forms both a pressure seal and a thermal seal to protect the internal components of the rocket stage 102 during the reentry and flight through the earth's atmosphere.

Those skilled in the art will appreciate that the retraction of the nose cone 600 could be accomplished using various methods, e.g. mechanical and hydraulic retraction systems. In one preferred example, however, the nose cone 600 includes a retraction system having one or more ball screw linear guides. The ball screw linear guides could be of a conventional nature, but may be constructed from materials, such as aluminum alloy, that are appropriate for weight considerations and the aerodynamic and atmospheric conditions of space flight. Advantageously, the retraction system including the ball screw linear guides is operational to retract the nose cone 600 to the position of FIG. 7 for flight back to the earth, and operational to move the nose cone 600 back to the deployed position of FIG. 6 for use in future missions.

Figure 8:
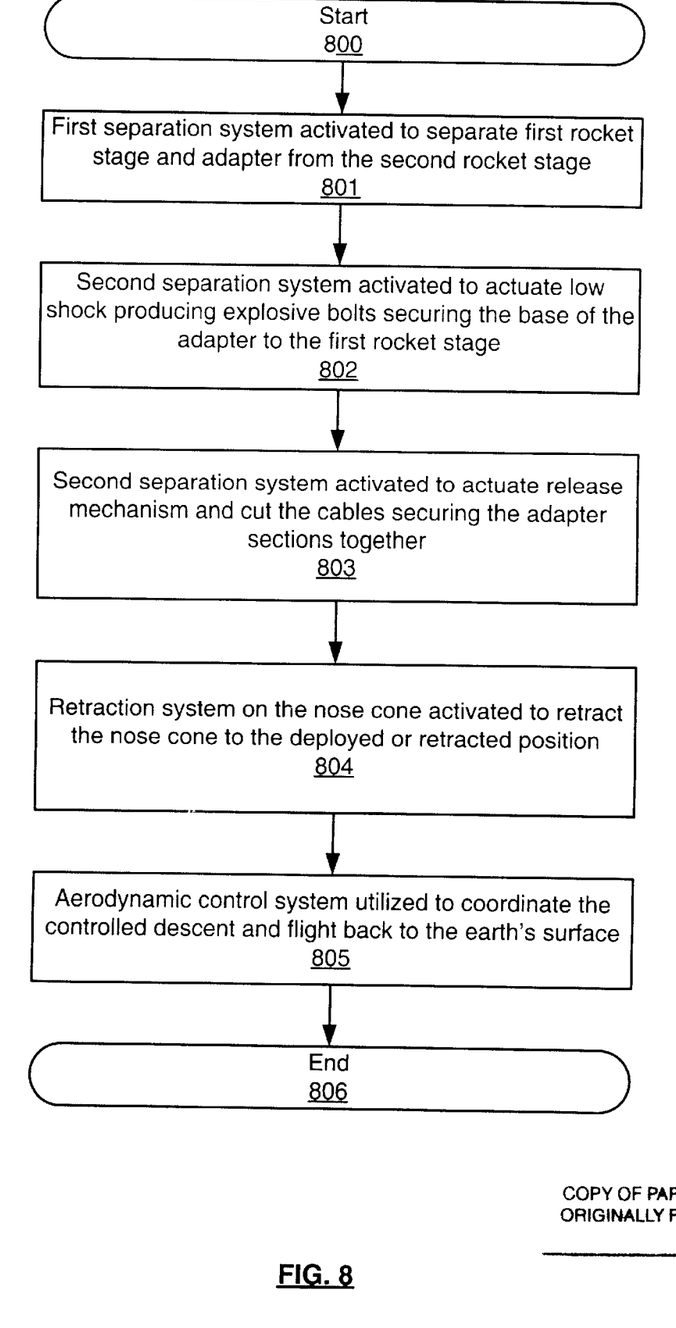

FIG. 8 is a flow chart illustrating an example of the operation of the adapter 112a. This example of the operation assumes that the space vehicle 100 has reached the altitude where the propulsion system 206 of the rocket stage 102 is terminated and the rocket stage 104 is ready for activation.

On FIG. 8, the operation begins at step 800. It should be noted that when the propulsion system 206 of the rocket stage 102 terminates operation, the adapter 112a is no longer subject to extreme aerodynamic loads. Thus, subsequent to termination of the propulsion system 206, the first separation system is activated to separate the rocket stage 102 and adapter 112a from the rocket stage 104, at step 801. As noted above this could include a pyrotechnic, hydraulic, or mechanical separation of the adapter 112a and rocket stage 102 from the rocket stage 104.

Thereafter, at step 802, the second separation system is activated to actuate the low shock producing explosive bolts of the explosive fastener assembly securing the base 208 of the adapter 112a to the rocket stage 102. Substantially simultaneously, although typically shortly thereafter, at step 803, the release mechanisms, e.g., 400A and 400B, are actuated to cut the cables, e.g., cable 406, securing the adapter sections 300, 302 and 304 together. As noted above, the adapter sections 300, 302 and 304 are pre-loaded so that when the explosive bolts are actuated and the cables cut, the adapter sections 300, 302 and 304 separate away from the rocket stage 102. At step 804, the retraction system on the nose cone 600 is activated to retract the nose cone 600 to the deployed or retracted position of FIG. 7. At step 805, the aerodynamic control system 202 is utilized to coordinate the controlled descent and flight back to the earth's surface and the operation ends at step 806.

Those skilled in the art will appreciate variations of the above-described embodiments that fall within the scope of the invention. As a result, the invention is not limited to the specific examples and illustrations discussed above, but only by the following claims and their equivalents.

I claim:

1. A space travel vehicle, comprising:
    a first rocket stage;
    a second rocket stage;
    at least one propulsion system connected to one of the first rocket stage and the second rocket stage;
    an adapter disposed between the first rocket stage and the second rocket stage forming a first interconnection between the second rocket stage and the adapter and a second interconnection between the first rocket stage and the adapter;
    a first separating system for separating the first interconnection between the second rocket stage and the adapter; and
    a second separating system for separating the second interconnection between the first rocket stage and the adapter, wherein the adapter is completely separated from the first and second stage upon activation of the first and second separating systems.

2. The vehicle of claim 1 wherein the first rocket stage and the second rocket stage are selected from the group comprising:
a payload, a booster rocket stage, and an upper rocket stage.

3. The vehicle of claim 1 wherein at least one of the first rocket stage and the second rocket stage is a reusable rocket stage including an aerodynamic control system and control surfaces for guidance of the at least one of the first and the second rocket stage back to the earth's surface.

4. The vehicle of claim 1 wherein the at least one propulsion system comprises:
at least one rocket engine.

5. The vehicle of claim 1 further comprising:
a shield apparatus disposed on one end of the first rocket stage.

6. The vehicle of claim 5 wherein the shield apparatus comprises:
an aerodynamically shaped nose cone that is movable longitudinally relative to the first rocket stage between deployed and un-deployed positions; and
a retraction system for moving the nose cone longitudinally relative to the first rocket stage.

7. The vehicle of claim 6 wherein when the shield apparatus is in the deployed position the shield apparatus forms a pressure seal with the first rocket stage.

8. The vehicle of claim 6 wherein when the shield apparatus is in the deployed position the shield apparatus forms a thermal seal with the first rocket stage.

9. The vehicle of claim 6 wherein the adapter comprises:
an elongated housing formed by the interconnection of a first, a second, and a third adapter section that define a central longitudinal cavity housing the nose cone, wherein the first, second, and third adapter sections include a first separation plane, a second separation plane, and a third separation plane at the interconnections of the first, second, and third adapter sections.

10. The adapter of claim 9 wherein the elongated housing is constructed from aluminum alloy.

11. The vehicle of claim 9 wherein the first interconnection between the second rocket stage and the adapter comprises:
a ribbed interface circumscribing the housing along a longitudinal axis of the housing; and
a mating interface on the second rocket stage, wherein when the ribbed interface and mating interface are interconnected they are separable by the first separating system.

12. The vehicle of claim 9 wherein the second interconnection between the first rocket stage and the adapter comprises:
a fastener assembly disposed about and connecting a base of the elongated housing to the first rocket stage.

13. The vehicle of claim 12 wherein the second separating system comprises:
low shock producing explosive hard point fittings connected to the fastener assembly.

14. The vehicle of claim 12 wherein the second interconnection comprise:
at least one first pulley mounted on one of the first, second, and third adapter sections;
at least one second pulley mounted on another one of the first, second, and third adapter sections; and
a cable alternately wound between the first and second pulleys and having a first end terminating at the one of the first, second, and third adapter sections and a second end terminating at the another one of the first, second, and third adapter sections to secure the one of the first, second, and third adapter section and the another one of the first, second, and third adapter section together as a single unit forming the elongated housing.

15. The vehicle of claim 14 wherein the second separating system comprises:
means to sever the cable to separate the one of the first, second, and third adapter sections from the another one of the first, second, and third adapter sections.

16. The vehicle of claim 14 wherein the second interconnection is pre-loaded to provide a lateral deployment of the first, second, and third adapter sections of the housing upon separation.

17. An interstage adapter assembly for interconnecting a first rocket stage to a second rocket stage, comprising:
a shield apparatus disposed on one end of the first rocket stage, wherein the shield apparatus is longitudinally deployable relative to the first rocket stage;
an elongated housing formed by the interconnection of a first, a second, and a third adapter section that define a central longitudinal cavity housing the shield apparatus, wherein the first, second, and third adapter sections define a first separation plane, a second separation plane, and a third separation plane at the interconnections of the first, second, and third adapter sections;
a first separating system for separating the adapter and the second rocket stage; and
a second separating system for separating the elongated housing from the first rocket stage.

18. The adapter assembly of claim 17 wherein the second separating system comprise:
at least one first pulley mounted on one of the first, second, and third adapter sections;
at least one second pulley mounted on another one of the first, second, and third adapter sections; and
a cable alternately wound between the first and second pulleys and having a first end terminating at the one of the first, second, and third adapter sections and a second end terminating at the another one of the first, second, and third adapter sections to secure the one of the first, second, and third adapter section and the another one of the first, second, and third adapter section together as a single unit forming the elongated housing; and
means to sever the cable to separate the one of the first, second, and third adapter sections from the another one of the first, second, and third adapter sections.

19. The adapter assembly of claim 17 wherein the second separating system comprises:
a fastener assembly comprising low shock producing explosive hard point fittings disposed about and connecting a base of the elongated housing to the first rocket stage.

20. The adapter assembly of claim 17 wherein the shield apparatus comprises:
a retraction system for moving the shield apparatus longitudinally relative to the first rocket stage between deployed and un-deployed positions.

21. The adapter assembly of claim 20 wherein when the shield apparatus is in the deployed position the shield apparatus forms a pressure seal with the first rocket stage.

22. The adapter assembly of claim 20 wherein when the shield apparatus is in the deployed position the shield apparatus forms a thermal seal with the first rocket stage.

23. The adapter assembly of claim 20 wherein the shield apparatus comprises:
an aerodynamically shaped nose cone.

24. A method for separating a first rocket stage from a second rocket stage that are interconnected by an adapter, the method comprising the steps of:
separating the first rocket stage and the adapter from the second rocket stage;
separating the adapter from the first rocket stage; and
longitudinally deploying a nose cone relative to the first rocket stage.

25. The method of claim 24 wherein the step of separating the adapter comprises:
separating at least two adapter sections form the first rocket stage, wherein prior to the step of separating the at least two adapter sections, the at least two adapter sections are interconnected to form a housing about the nose cone.

26. The method of claim 25 wherein the step of separating the at least two adapter sections comprises:
separating a base of the interconnected at least two adapter sections from the first rocket stage; and
separating a first one of the at least two adapter sections from a second one of the at least two adapter sections.

27. The method of claim 26 wherein the step of separating the base of the interconnected at least two adapter sections from the first rocket stage comprises:
actuating low shock producing explosive bolts to release a fastener assembly connecting the base of the interconnected at least two adapter sections and the first rocket stage.

28. The method of claim 26 wherein the step of separating the first one of the at least two adapter sections from the second one of the at least two adapter sections comprises:
cutting at least one cable securing the first one of the at least two adapter sections to the second one of the at least two adapter sections.

29. The method of claim 24 wherein the step of longitudinally deploying comprises:
retracting the nose cone relative to the first rocket stage to form a seal between the nose cone and the first rocket stage.

30. The method of claim 29 wherein the step of longitudinally deploying comprises:
retracting the nose cone relative to the first rocket stage to form a pressure seal between the nose cone and the first rocket stage.

31. The method of claim 29 wherein the step of longitudinally deploying comprises:
retracting the nose cone relative to the first rocket stage to form a thermal seal between the nose cone and the first rocket stage.

32. The method of claim 29 wherein the step of longitudinally deploying comprises:
retracting the nose cone relative to the first rocket stage to cover a portion of the first rocket stage that was used in the interconnection of the adapter to the first rocket stage.

33. A space travel vehicle, comprising:
a first rocket stage;
a second rocket stage, wherein at least one of the first and second rocket stage is a reusable rocket stage including an aerodynamic control system and control surfaces for guidance of the at least one of the first and the second rocket stage back to the earth's surface;
at least one propulsion system connected to one of the first rocket stage and the second rocket stage;
an adapter disposed between the first rocket stage and the second rocket stage forming a first interconnection between the second rocket stage and the adapter and a second interconnection between the first rocket stage and the adapter;
a first separating system for separating the first interconnection between the second rocket stage and the adapter; and
a second separating system for separating the second interconnection between the first rocket stage and the adapter.

34. The vehicle of claim 33 further comprising:
a shield apparatus disposed on one end of the first rocket stage.

35. The vehicle of claim 34 wherein the shield apparatus comprises:
an aerodynamically shaped nose cone that is movable longitudinally relative to the first rocket stage between deployed and un-deployed positions; and
a retraction system for moving the nose cone longitudinally relative to the first rocket stage.

36. The vehicle of claim 35 wherein when the shield apparatus is in the deployed position the shield apparatus forms a pressure seal with the first rocket stage.

37. The vehicle of claim 35 wherein when the shield apparatus is in the deployed position the shield apparatus forms a thermal seal with the first rocket stage.

38. A space travel vehicle, comprising:
a first rocket stage;
a second rocket stage;
at least one propulsion system connected to one of the first rocket stage and the second rocket stage;
an adapter disposed between the first rocket stage and the second rocket stage forming a first interconnection between the second rocket stage and the adapter and a second interconnection between the first rocket stage and the adapter;
a first separating system for separating the first interconnection between the second rocket stage and the adapter;
a second separating system for separating the second interconnection between the first rocket stage and the adapter; and
a shield apparatus disposed on one end of the first rocket stage, wherein the shield apparatus comprises:
an aerodynamically shaped nose cone that is movable longitudinally relative to the first rocket stage between deployed and un-deployed positions; and
a retraction system for moving the nose cone longitudinally relative to the first rocket stage.

39. The vehicle of claim 38 wherein when the shield apparatus is in the deployed position the shield apparatus forms a pressure seal with the first rocket stage.

40. The vehicle of claim 38 wherein when the shield apparatus is in the deployed position the shield apparatus forms a thermal seal with the first rocket stage.

41. The vehicle of claim 38 wherein the adapter comprises:
an elongated housing formed by the interconnection of a first, a second, and a third adapter section that define a central longitudinal cavity housing the nose cone, wherein the first, second, and third adapter sections include a first separation plane, a second separation plane, and a third separation plane at the interconnections of the first, second, and third adapter sections.

* * * * *